United States Patent
Cerea

(10) Patent No.: US 10,912,328 B2
(45) Date of Patent: Feb. 9, 2021

(54) PROCESS FOR THE DEEP-FREEZING OF A SUBSTANTIALLY FLUID FOOD PREPARATION

(71) Applicant: Ambiente E Nutrizione S.R.L., Rozzano (IT)

(72) Inventor: Giuseppina Cerea, Rozzano (IT)

(73) Assignee: Ambiente E Nutrizione S.R.L., Rozzano (IT)

(*) Notice: Subject to any disclaimer, the term of this patent is extended or adjusted under 35 U.S.C. 154(b) by 197 days.

(21) Appl. No.: 16/158,420

(22) Filed: Oct. 12, 2018

(65) Prior Publication Data

US 2019/0037907 A1 Feb. 7, 2019

Related U.S. Application Data

(62) Division of application No. 14/235,266, filed as application No. PCT/EP2012/003228 on Jul. 30, 2012, now Pat. No. 10,130,114.

(30) Foreign Application Priority Data

Jul. 29, 2011 (EP) .................................. 11425206

(51) Int. Cl.

| A23P 30/10 | (2016.01) |
| A23L 3/36 | (2006.01) |
| A23P 10/22 | (2016.01) |
| A23L 23/00 | (2016.01) |
| A23L 3/375 | (2006.01) |
| F25D 3/11 | (2006.01) |

(52) U.S. Cl.
CPC .............. *A23P 30/10* (2016.08); *A23L 3/361* (2013.01); *A23L 3/375* (2013.01); *A23L 23/00* (2016.08); *A23P 10/22* (2016.08); *F25D 3/11* (2013.01)

(58) Field of Classification Search
CPC ........... A23P 30/10; A23L 3/361; A23L 3/375
USPC .................................................. 426/524, 589
See application file for complete search history.

(56) References Cited

U.S. PATENT DOCUMENTS

| 4,829,783 A | 5/1989 | Buchmuller et al. |
| 4,858,445 A | 8/1989 | Rasovich |
| 4,929,456 A | 5/1990 | Bejarano-Wallens et al. |
| 5,911,741 A | 6/1999 | Weyermanns et al. |
| 6,251,447 B1 | 6/2001 | Olofsson et al. |
| 2006/0134274 A1 | 6/2006 | Ladd et al. |
| 2010/0055285 A1 | 3/2010 | Desjardins-Lavisse et al. |
| 2010/0229591 A1 | 9/2010 | Pathier et al. |
| 2010/0233342 A1 | 9/2010 | Rivera et al. |

FOREIGN PATENT DOCUMENTS

| EP | 1075794 A1 | 2/2001 |
| ES | 2133235 A1 | 9/1999 |
| ES | 2194588 A1 | 11/2003 |
| WO | 2010063918 A1 | 6/2010 |

OTHER PUBLICATIONS

International Search Report issued in counterpart PCT Application No. PCT/EP2012/003228.

*Primary Examiner* — Jyoti Chawla
(74) *Attorney, Agent, or Firm* — Silvia Salvadori, P.C.; Silvia Salvadori

(57) ABSTRACT

A frozen condiment selected from the group consisting of sauces, pastes, pâtés, creams and pizza toppings, having hygienic and organoleptic features comparable with those of a corresponding fresh condiment, which is in the form of granules having a porous surface, having an average weight of 6.0 g or less and essentially homogeneous in size having a diameter comprised between 1 mm and 20 mm, and apt to determine a rapid and uniform thawing of the deep-frozen condiment.

3 Claims, 5 Drawing Sheets

PROCESS FOR THE DEEP-FREEZING OF A SUBSTANTIALLY FLUID FOOD PREPARATION

This non-provisional application is a divisional application of U.S. application Ser. No. 14/235,266, filed on Feb. 13, 2014, which is a U.S. National Stage of PCT/EP2012/003228 filed on Jul. 30, 2012, which claims priority to and the benefit of European Application No. 11425206.7, filed on Jul. 29, 2011, the contents of which are incorporated herein by reference in their entireties.

DESCRIPTION

Field of Application

The present invention relates in general to the food industry field. In particular, the invention relates to a process for the deep-freezing of a substantially fluid condiment and to a related implementation system.

Prior Art

Deep-frozen fluid food preparations, such as for example sauces, pastes, pasta sauces and the like, intended for catering or domestic consumption, have long been on sale.

Food preparations of the above-considered type can take the form of deep-frozen masses weighing 500-1000 grams each, the so-called "block frozen", obtained by means of static deep-freezing, and they generally require lengths of time exceeding 15 minutes for defrosting and for preparation by the user.

In alternative to the "block frozen", the prior art provides deep-frozen condiments in the form of cubes, parallelepipeds, cylinders or other solid shapes, having a unit weight comprised between 10 and 50 g, known as IQF products (Individually Quick Frozen), which are obtained by means of quick freezing.

IQF sauces and similar condiments have a thawing time generally comprised between 5 and 10 minutes.

Different processes are known for producing IQF frozen sauces and similar condiments, the most widespread of which involves the deposition of the sauce to be deep-frozen on a cooled conveyor belt of a deep-freezer, for example of the tunnel type.

The sauce is deposited in a uniformly-thick layer on the cooled belt and deep-frozen, thus obtaining a deep-frozen layer of sauce, which then undergoes cutting operations to obtain a plurality of small plate-like portions.

The IQF frozen sauces and pasta sauces currently on sale thus represent an improvement over block frozen sauces both in terms of the time of preparation by the consumer of the food for which the condiment is intended, and in terms of the ease of dosage; but they are nevertheless characterized by lengths of time and conditions of use which are not compatible with the requirements of fast catering and with the need, at home, to be able to dose the food preparation as desired (free portioning), easily, and without waste.

In fact, it is found that the thawing times of the deep-frozen sauces and pasta sauces presently on sale impose, particularly in the catering field, a compromise between quality and preparation time.

In fact, large blocks that are defrosted and/or cooked rapidly undergo burning or dehydration phenomena in some areas, for example in the outermost parts, depending on the thawing process used (pan, oven, microwave oven, etc.) and, they thus cause unevenness in the finished product.

Therefore, generally, in order to obtain an even, and thus optimal, thawing of the deep-frozen product, it is necessary to defrost the blocks very slowly.

The need for a slow defrosting of the blocks imposes, in turn, some constraints on the versatility of use of the product by the consumer.

In the catering field, for example, and particularly in fast catering such as that offered in railway stations, airports, fast-food restaurants, etc., there is the need to prepare good-quality dishes rapidly. However, because of their size, the deep-frozen blocks currently on sale must be taken out of the freezer in advance, for the reasons explained above. Given the unpredictability of the orderings, this inevitably causes waste for the caterer.

Still in the catering field as well as at home, the size of the above-mentioned blocks is moreover binding to some extent also in terms of condiment dosage. In fact, large blocks do not allow a free and/or precise dosing with respect to other ingredients of a recipe in the preparation of a dish and therefore, also in this case, there is waste of the food preparation used.

Likewise, when it is desired to mix together two or more of the condiments of the above-described type, the user is at present highly constrained by the large size of the blocks, in terms of both the exact and/or desired free dosing of the condiments, and the preparation times. It follows that, in this case also, block size causes a waste of the condiment.

Moreover, it is known that fluid foods containing lipids, as is mostly the case in condiments, can undergo undesirable phase separation upon thawing, which affects the organoleptic properties of such foods.

Moreover, the above-described IQF process suffers from some drawbacks among which the impossibility to switch between different products in the same apparatus, and particularly on the same conveyor belt, without prolonged interruptions in the process for the washing and the disinfection of the apparatus itself between the use of one product and the use of another.

In view of the above-mentioned drawbacks reported to date by the prior art, there is the need to make available a deep-frozen food preparation, particularly a condiment, such as a pasta sauce, a sauce, a pâté, a cream and the like, having a short thawing time, considerably shorter than that required by prior art deep-frozen condiments, and having hygienic and organoleptic features comparable to those of a corresponding fresh preparation, as well as a process for producing such deep-frozen food preparation, being particularly versatile and easy to carry out.

In parallel, there is also the need to make available a system for carrying out a process for the deep-freezing of a substantially fluid food preparation, particularly a condiment such as a pasta sauce, a sauce, a pâté, a cream and the like, which allows to obtain a deep-frozen food preparation of the above-mentioned type, overcoming the drawbacks mentioned with reference to the prior art.

SUMMARY OF THE INVENTION

Said needs are met according to the invention by a deep-frozen condiment chosen from the group consisting of sauces, pastes, pâtés, creams and pizza toppings and having hygienic and organoleptic features comparable with those of a corresponding fresh condiment prior to the deep-freezing, characterized in that it is in the form of granules having a porous surface and having an average weight of 6.0 g or less, preferably comprised between 1.0 and 5.0 g, and essentially homogeneous in size having a diameter comprised between 1 mm and 20 mm, preferably between 3 mm and 15 mm, such granules being apt to determine a rapid and uniform thawing of said deep-frozen condiment, even in the absence of a prior defrosting.

Advantageously, said granules have an average weight comprised between 1.0 and 3.0 g.

The condiment according to the invention preferably consists of a tomato-based, white sauce based, fat-based, oil-based, cheese-based, mayonnaise-based, meat-based, fish-based, vegetable-based or mixed base sauce.

The condiment preferably contains at least 3%, more preferably at least about 6%, in weight over the weight of the condiment of lipids.

Preferably, the condiment has a density comprised between 0.8 and 1.2 g/cm$^3$, more preferably of about 1.0 g/cm$^3$.

In another aspect, the present invention relates to a process for the deep-freezing of a substantially fluid condiment and particularly for producing deep-frozen granules of said condiment, comprising the steps of:
providing a substantially fluid condiment;
dividing said condiment into a plurality of drops;
performing a first deep-freezing step of said drops, by dosing them within a liquid bath at a temperature of −150° C. or lower and holding them in such bath for a predetermined first time interval, thus obtaining a plurality of partially deep-frozen granules of said condiment, said partially deep-frozen granules having a hard external surface (deep-frozen) and a soft core (not completely deep-frozen);
exposing for a predetermined second time interval said plurality of partially deep-frozen granules of said condiment to a second deep-freezing step at a temperature comprised between −30° C. and −90° C., preferably between −60° C. and −70° C., thus obtaining a plurality of deep-frozen granules of said condiment;
subjecting the plurality of deep-frozen granules thus obtained to a refining step, wherein at least a part of said plurality of deep-frozen granules is reduced in size thus obtaining a plurality of deep-frozen granules having an average weight lower than 6.0 grams, preferably comprised between 1.0 and 5.0 g, advantageously between 1.0 and 3.0 g, and essentially homogeneous in size with a diameter preferably comprised between 1 mm and 20 mm, advantageously between 3 and 15 mm.

Said deep-frozen granules of condiment are then packaged and stored according to methods known in the field.

Preferably said substantially fluid condiment is divided into a plurality of drops at a temperature comprised between 0° C. and 4° C.

Preferably, said drops have a diameter comprised between 6 and 20 mm.

Preferably said first time interval has a duration comprised between 10 seconds and 60 seconds, more preferably between 15 seconds and 30 seconds.

Preferably said second time interval has a duration comprised between 30 seconds and 180 seconds, more preferably between 45 seconds and 120 seconds.

Preferably said first time interval of the first deep-freezing step is shorter than said second time interval of the second deep-freezing step.

Preferably said liquid is nitrogen and it has a temperature comprised between −150° C. and −197° C.

Preferably said second deep-freezing step is performed at a temperature of about −65° C.

Preferably said substantially fluid condiment is a sauce, a pasta sauce, a paste, a pâté, a cream, a pizza topping and similar condiments, of the type suitable for use and consumption for example with rice, pasta, toasted bread, canapés, hot or cold, optionally after cooking.

The substantially fluid condiment preferably contains at least 3%, more preferably at least about 6%, in weight over the weight of the condiment of lipids.

Preferably, the condiment has a density comprised between 0.8 and 1.2 g/cm$^3$, more preferably of about 1.0 g/cm$^3$.

Therefore, according to the invention, said condiment can be tomato-based, white sauce-based or fat-based, for example oil-based, cheese-based, mayonnaise-based, meat-based, vegetable-based, herb-based among which basil, parsley, sage, rosemary and the like, or mixed-based, and it can optionally comprise ingredients in pieces, for example of meat, fish, vegetables, cheese, or other, or mixtures thereof.

It must be added that the condiment according to the invention can be a cooked preparation, a preparation wherein only some ingredients are cooked, or an uncooked preparation, which can be eaten cold or heated.

According to the invention, said process is carried out in a system for the deep-freezing of a substantially fluid condiment of the above type, comprising:
a dosing device to dose drop-wise said condiment;
a first deep-freezing section arranged downstream of said dosing device, comprising a liquid bath kept at a temperature of −150° C. or lower wherein the drops of said condiment are fed and wherefrom is discharged a condiment in the form of partially deep-frozen granules, having a deep-frozen and hard external surface, and a soft, not completely deep-frozen core;
a second deep-freezing section arranged downstream of said first deep-freezing section, operating at a temperature comprised between −30° C. and −90° C., preferably between −60° C. and −70° C., wherein said condiment in the form of partially deep-frozen granules exiting said first deep-freezing section is fed, and wherefrom a condiment in the form of deep-frozen granules is discharged;
a refining device arranged downstream of said second deep-freezing section, for the reduction in size of at least part of the condiment deep-frozen granules exiting the second deep-freezing section;
a packaging device of said condiment in the form of deep-frozen granules, arranged downstream of said second deep-freezing section.

Said dosing device is a device suitable to form drops comprising a perforated plate or a grid, advantageously arranged horizontally above said first deep-freezing section, through which the condiment is dosed and fed drop-wise into said first deep-freezing section.

Preferably said perforated plate or grid comprises holes or openings having a diameter or width comprised between 6 mm and 13 mm.

Preferably said dosing device also comprises stirring and spreading means of said condiment.

Preferably the present system comprises conveyor means to transport said condiment in the form of partially deep-frozen granules from the first deep-freezing section to the second deep-freezing section, and the condiment in the form of deep-frozen granules from the second deep-freezing section to the packaging device.

Preferably said conveyor means comprise one or more conveyor belts which can be arranged in series and/or in parallel with respect to one another.

Preferably said first deep-freezing section comprises a liquid nitrogen bath at a temperature comprised between −150° C. and −197° C.

More preferably, at least one conveyor belt is at least partially immersed in said liquid bath which advantageously comprises a tank containing a liquid nitrogen head.

Preferably, said second deep-freezing section comprises a tunnel at least partially crossed by said conveyor means.

Preferably said refining device comprises an Archimedean screw, and more preferably it comprises a perforated plate or grid removably associated to a terminal end of said Archimedean screw.

Preferably said perforated plate or grid associated to the Archimedean screw comprises square-section holes or openings, having preferably a width comprised between 1 mm and 20 mm.

In substance, it has been surprisingly found that by exposing a substantially fluid condiment of the above-mentioned type dosed drop-wise to the process of the present invention it is possible to obtain condiment deep-frozen granules, and particularly substantially homogeneous granules of predetermined weight, size and shape, which advantageously allow, when the condiment is used, full versatility in the portioning of the condiment, i.e. of the granules, and in the meantime the advantage of a thawing time which is short and anyway considerably reduced with respect to the deep-frozen condiments provided by the prior art, preserving at the same time the quality of the condiment during both the deep-freezing and the thawing thereof.

As mentioned above, the condiment of the present invention has a lipid content of at least 3%, more preferably of at least about 6%, in weight over the weight of the condiment and exhibits a density comprised between 0.8 and 1.2 $g/cm^3$, preferably of about 1.0 $g/cm^3$.

As already mentioned, the presence of lipids in a fluid food, in this case a condiment, can cause undesirable phase separation upon thawing, which can affect the organoleptic properties of foods.

It has been found that the present deep-freezing process reduces dehydration, it allows to preserve the organoleptic properties and the surface appearance and it prevents damage of the cell structure of the foods, and thus of the condiment ingredients, and particularly thanks to said rapid deep-freezing step the hygienic and organoleptic features of the corresponding fresh condiment are preserved.

The granules composing the deep-frozen condiment according to the invention can take the appearance of flakes or chips and they are characterized in any case by a high porosity which considerably favours and speeds up defrosting (both by direct heating in a pan and in a microwave oven), which furthermore occurs in a definitely more homogeneous way than for the IFQ frozen sauces on sale, with no risk of overcooking or even burning of some parts of the food product.

Further features and advantages of the present invention will be apparent from the following description of some embodiments given for the purpose of indication, not limitation, with reference to the attached drawings.

DETAILED DESCRIPTION OF THE INVENTION

Figure 1:
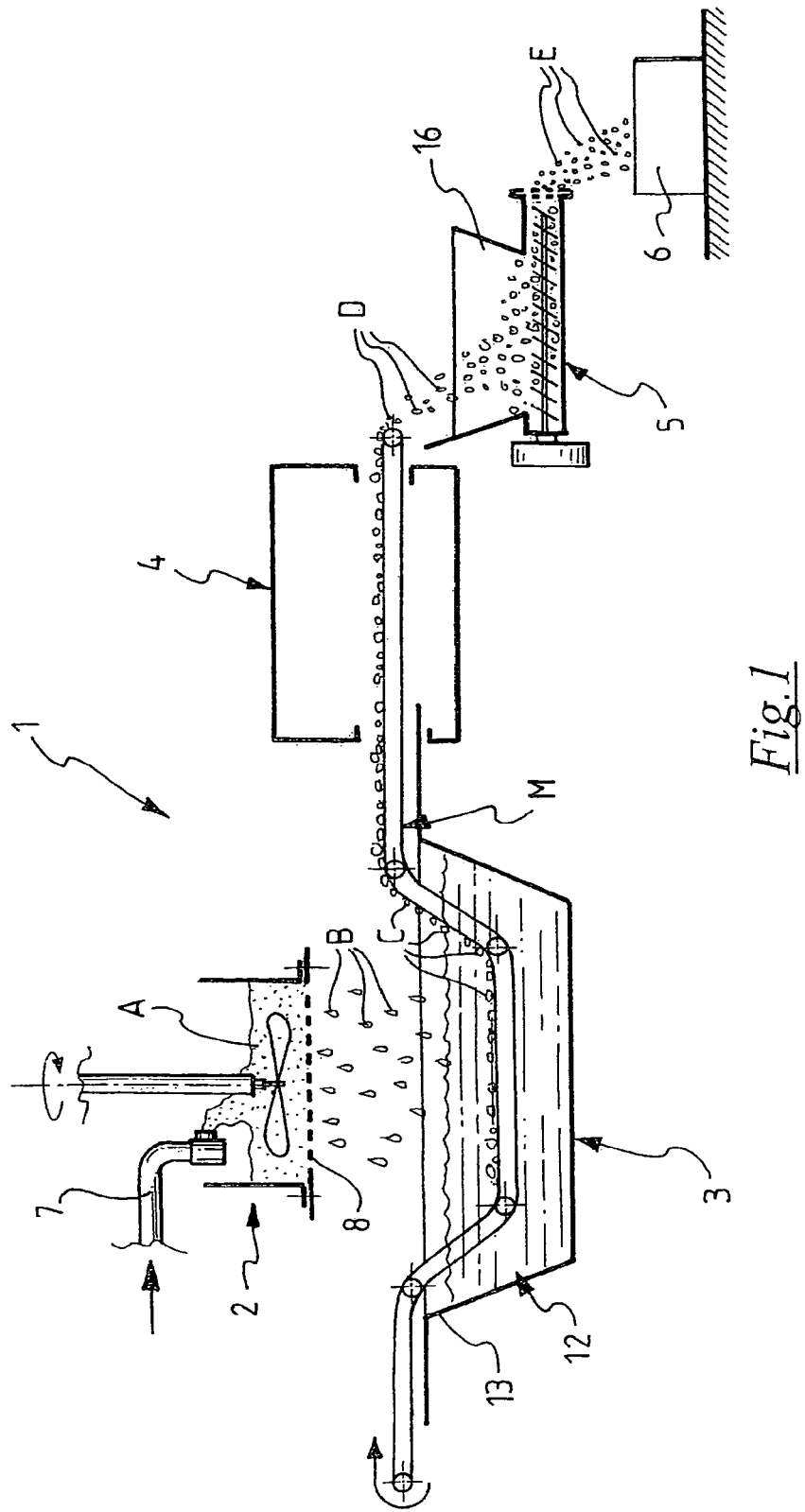
FIG. 1 schematically shows a system for the deep-freezing of a substantially fluid condiment according to an embodiment of the present invention.

A process for the deep-freezing of a substantially fluid condiment A according to a preferred embodiment of the present invention is described with reference to FIGS. 1-5 showing a related implementation system, globally indicated with 1.

The system 1 essentially comprises a dosing device or dosing feeder 2, a first deep-freezing section 3, a second deep-freezing section 4, a refining device 5, a packaging device 6, arranged in series with respect to each other, and conveyor means of the condiment globally indicated with M.

The dosing feeder 2, wherein the substantially fluid condiment A is fed through a duct 7, preferably at a temperature comprised between 0° C. and 4° C., essentially comprises a plate 8 provided with a plurality of holes or passages 9 of a predetermined size, whereon a cylindrical body 10 abuts and is fixed, having open ends to substantially form a container having a perforated bottom.

Figure 2:
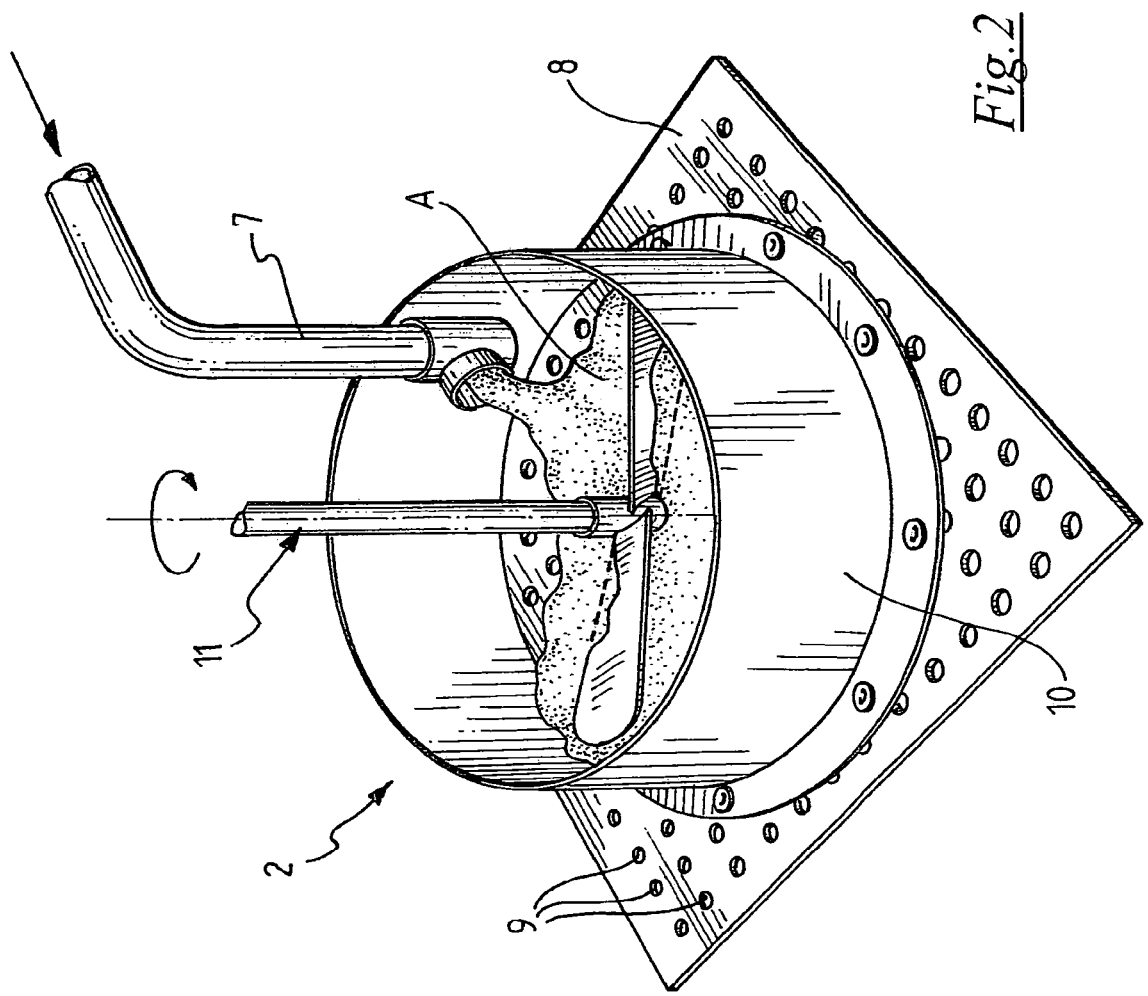
FIG. 2 shows a detail of the system of FIG. 1, specifically a dosing device of said substantially fluid condiment according to an embodiment of the invention.
Figure 3:
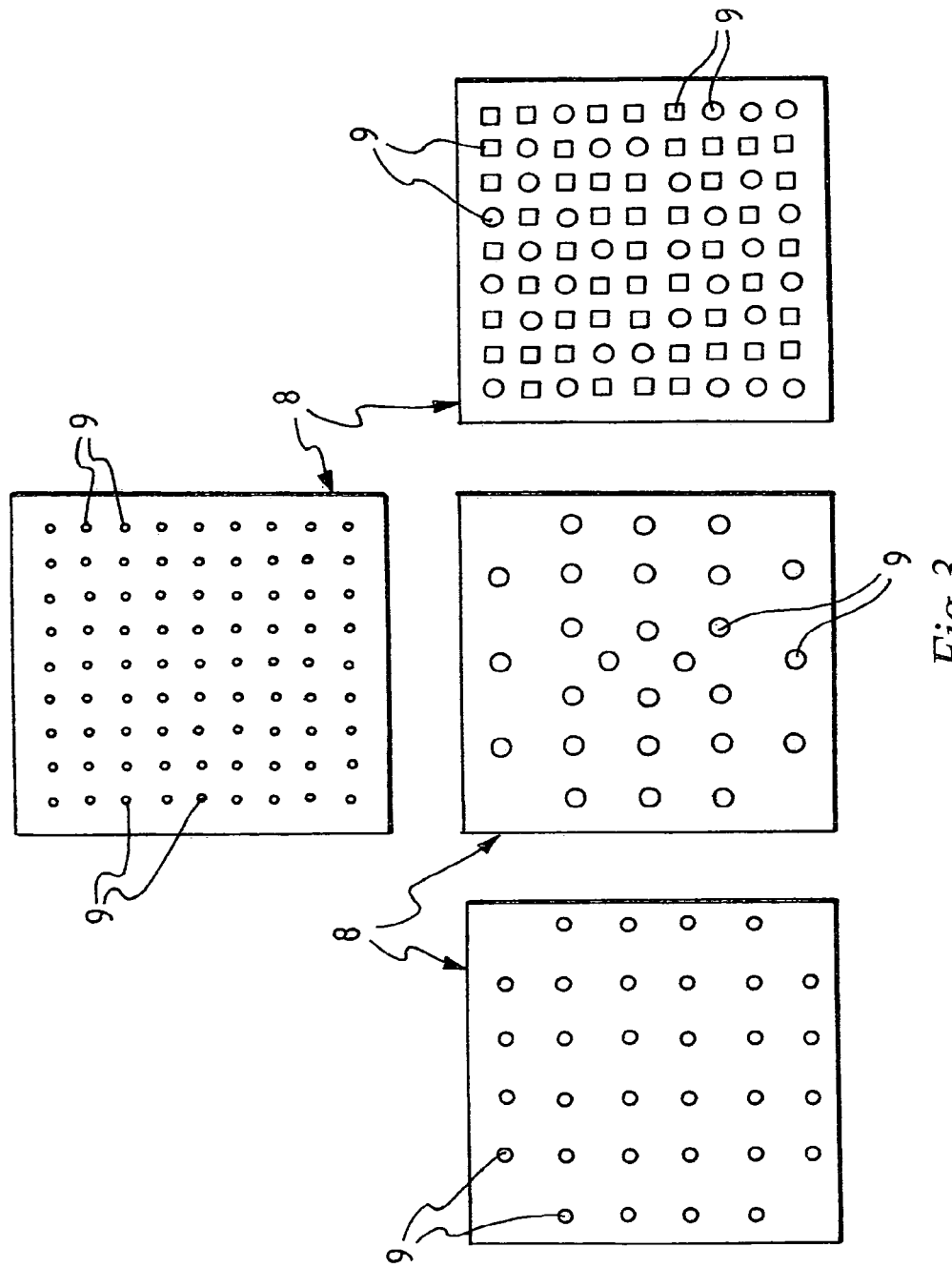
FIG. 3 shows a detail of the dosing device of FIG. 2, specifically a plurality of perforated plates or grids according to alternative embodiments of the present invention.

In the example of FIG. 2, according to a preferred embodiment, the dosing feeder 2 also comprises stirring-spreading means globally indicated with 11, comprising rotating blades, aiding and optimizing the distribution of the substantially fluid condiment A on the plate 8, and thus the passage of the condiment itself through holes 9 and, thus the dosing of the substantially fluid condiment in the first deep-freezing section 3, arranged below downstream of the dosing feeder 2.

The first deep-freezing section 3 is a section with a particularly reduced temperature, of −150° C. or lower, and according to the example shown in FIG. 1 it essentially comprises a liquid nitrogen bath 12, particularly a tank 13 containing a liquid nitrogen head at a temperature of about −197° C.

The substantially fluid condiment A is thus dosed in the first deep-freezing section 3 by means of the perforated plate 8, and particularly condiment drops indicated with B are caused to fall by gravity in the nitrogen bath 12, wherein they remain immersed for a predetermined time interval, preferably comprised between 15 and 30 seconds.

Immersed in the liquid nitrogen head, the condiment drops B undergo, because of the very low temperature, a rapid deep-freezing process, and particularly the deep-freezing of the surface layer thus forming partially frozen granules of the condiment, indicated with C, having a hard and deep-frozen external surface and a soft not completely deep-frozen core.

Afterwards, the partially deep-frozen granules C of condiment leave the first deep-freezing section 3 and they are fed into the second deep-freezing section 4.

The partially deep-frozen granules C are transported from the first deep-freezing section 3 to the second deep-freezing section 4 by means of the above-mentioned conveyor means M which, in the embodiment shown in the examples of the figures, comprise a conveyor belt, this not excluding, however, the possibility of providing a system of conveyor belts arranged in series and/or in parallel with each other.

For example, in the case of conveyor belts in series, a first conveyor belt can be contemplated in the first deep-freezing section and a second conveyor belt in the second deep-freezing section, arranged so that the condiment is moved from the first belt to the second conveyor belt in a point of the system comprised between the two deep-freezing sections. In this way it is possible to adjust at will the speed of each conveyor belt and thus the residence time of the condiment in the respective deep-freezing section, residence time which can be also determined, independently for the two deep-freezing sections even in case of a single conveyor belt, on the basis of the length of the first and second deep-freezing sections.

Going back to the example of FIG. 1, a conveyor belt crossing the first and second deep-freezing sections is contemplated, and precisely a conveyor belt at least partially immersed in the liquid nitrogen bath 12 of the first deep-freezing section 3, whereon the condiment partially deep-frozen granules C are collected.

In detail, again as shown in the example of FIG. 1, conveyor means M immerse in the liquid nitrogen bath 12, they cross at least a length of the nitrogen bath while being immersed in the liquid nitrogen head and in that length they collect the condiment partially deep-frozen granules C, meaning that the partially deep-frozen granules descending into the liquid nitrogen head deposit on the conveyor means which emerge from the nitrogen bath 12 at an end of the tank 13 transporting the condiment partially deep-frozen granules C out of the first deep-freezing section 3 to feed them into the second deep-freezing section 4.

The second deep-freezing section 4 essentially comprises a tunnel provided with inlet and outlet openings, at a temperature comprised between about −30° C. and −90° C., preferably between −60° C. and −70° C., suitably of about −65° C., wherein the condiment and particularly the partially deep-frozen granules C, transported by the conveyor means M, complete the deep-freezing process.

Figure 4:
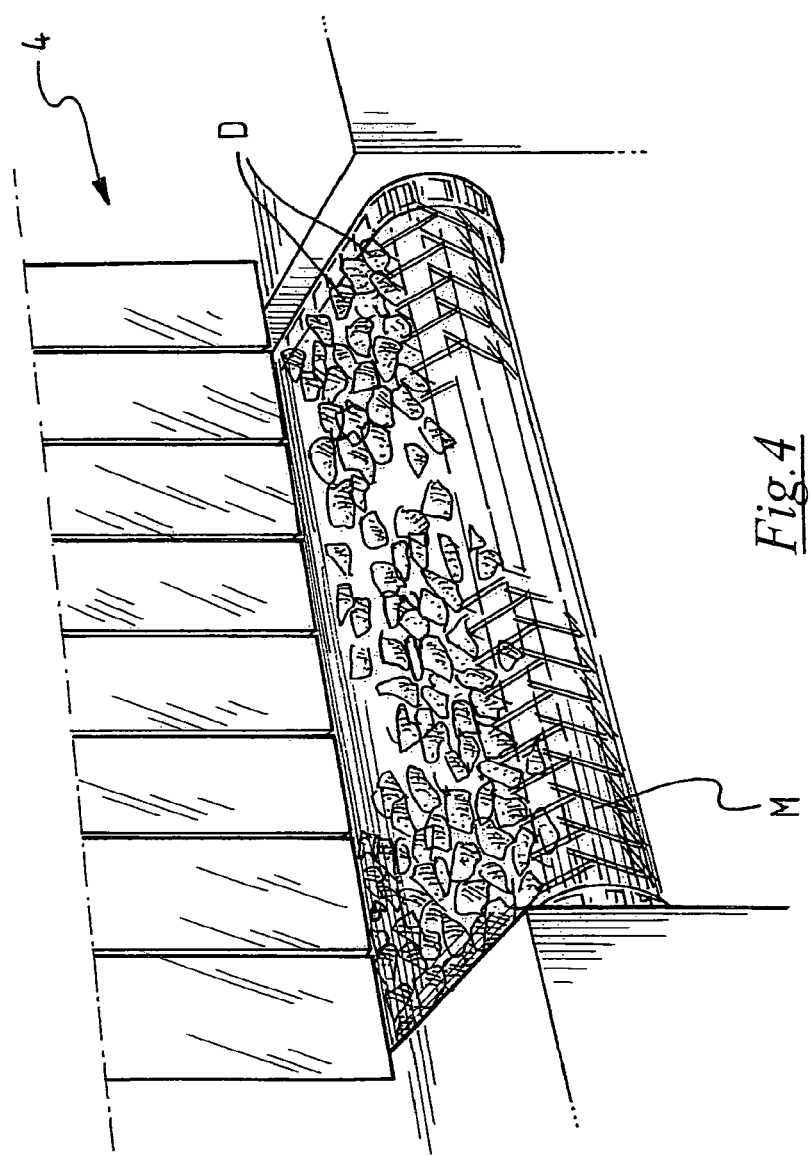
FIG. 4 shows a detail of the system of FIG. 1, specifically an end portion of a conveyor belt exiting a deep-freezing section, particularly a second deep-freezing section of said condiment, according to an embodiment of the present invention.
Figure 5:
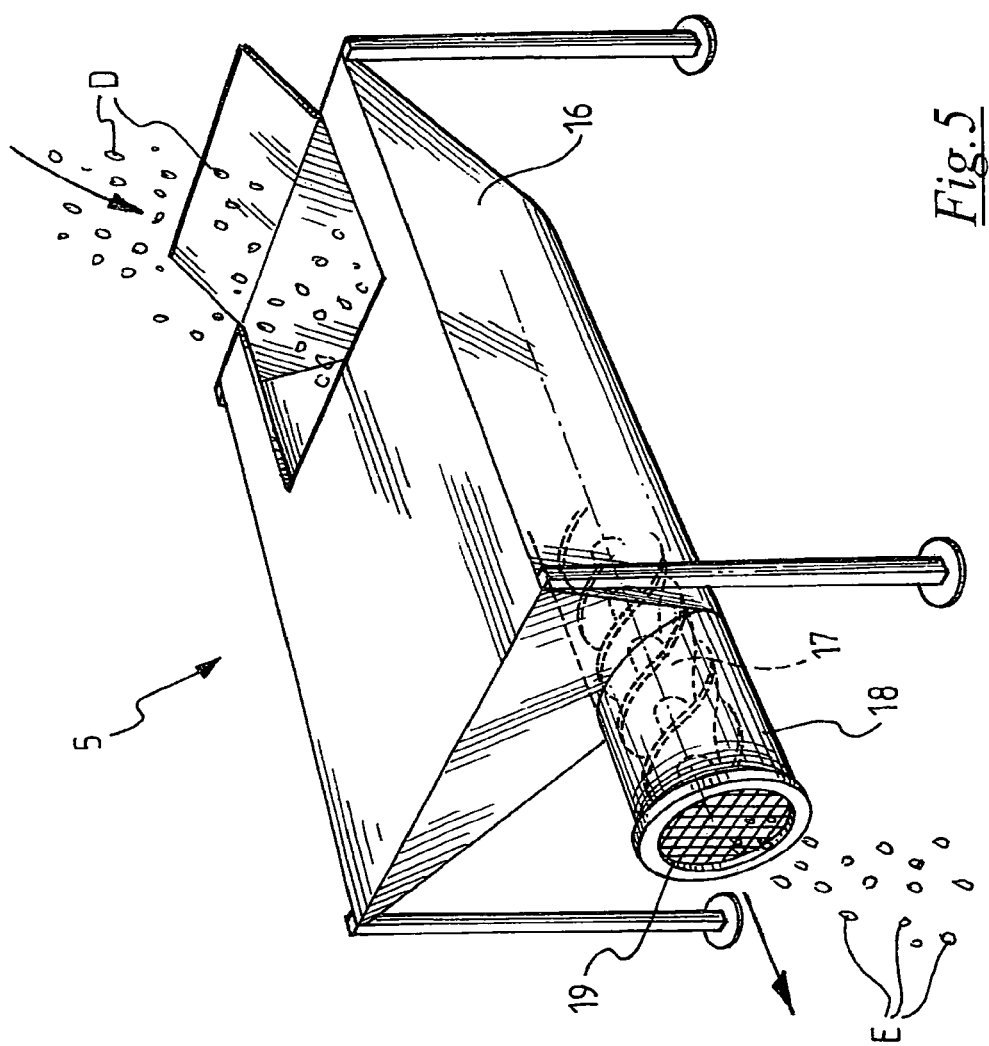
FIG. 5 shows a detail of the system of FIG. 1, specifically a refining device of said deep-frozen condiment to obtain frozen granules of predetermined size and weight according to an embodiment of the invention.

Condiment completely deep-frozen granules D are obtained at the output of the second deep-freezing section 4, as shown in particular in the example of FIG. 4.

Still according to the examples of the figures, condiment granules D are subsequently fed into the refining device 5, wherein a respective refining step is performed, i.e. of size reduction of at least part of condiment granules D coming from the second deep-freezing section 4, wherefrom condiment granules of a predetermined size are obtained, indicated with E.

The refining device 5, which is substantially a granulator, essentially comprises a tapered-section container or tank 16, at the bottom of which is placed a screw 17, preferably double-spiral, having a length extending beyond the tank 16, housed in a tube 18 abutting onto the tank 16, to substantially form an Archimedean screw, which optionally ends with a grid 19 according to the example of the figures.

The grid 19, removably associated to the tube 18, can be chosen according to the predetermined and desired condiment granulometry, and it is preferably a grid having perpendicular mesh wires forming passages having a substantially square section of a width comprised between 5 mm and 15 mm.

Condiment deep-frozen granules D fed into the tank 16 of the refining unit 5 are transported by the screw 17 towards the grid 19, and both in the path along the screw, and in the passage through the mesh wires of the grid 19 they are reduced in size, providing said granules E.

In substance, the refining step is carried out because granules of a predetermined size are desired, and particularly homogeneous in size and of particularly reduced dimensions, lower than those of the granules at the output of the second deep-freezing section which are determined by the holes or passages of the dosing device plate or grid.

Moreover, frozen granules at the end of the second deep-freezing step can optionally also take the form of agglomerates, which can be due for example to aggregation phenomena of the drops, of the partially deep-frozen granules or of the deep-frozen granules of condiment, or which can derive from condiment oversized drops due, for example, to an excessive fluidity of the condiment itself.

Condiment frozen granules, exiting the refining device are then sent to the packaging device 6, of the known type, where they are prepared for storage at a temperature generally comprised between −20° C. and −25° C., in packages of the rigid type such as cartons and the like, or of the soft type such as for example bag-type packages, for example of plastic material.

With respect to further details of the present invention, it must be added that according to a preferred embodiment, the nitrogen vapors released in the first deep-freezing section 3 from the liquid nitrogen bath 12 are used to cool the second deep-freezing section 4, where they are conveyed through a dedicated duct or system of ducts, suction fans, and directing or dispersion devices like blades, not shown in the examples of the figures.

In this way nitrogen vapors coming from the first deep-freezing section are directed all around condiment granules within the second deep-freezing section where the deep-freezing process is completed.

Advantageously, there is therefore an saving of energy in maintaining the second deep-freezing section at the desired temperature, which does not require additional energy for its cooling.

Moreover, the refining and packaging of the condiment are performed at the temperature of the deep-frozen granules and, thus, these steps too do not require the use of energy to maintain the process temperature since it is exclusively given by the deep-frozen product itself.

Example

A tomato sauce containing the below-indicated ingredients (% w/w) was prepared using traditional methods known in the field.
Tomato pulp 61.47
Semi-concentrated tomato 14.5
Water 11.2
Olive oil 9.2
Salt 1.9
Basil 1.2
Dehydrated pre-fried onion 0.5
Dehydrated garlic 0.03

In particular, the tomato pulp and the semi-concentrated tomato were put in a mixer wherein water and oil were subsequently added in the above-indicated proportions. The remaining ingredients were then added and mixed, and the resulting mixture was cooked for about 15 minutes, obtaining a substantially fluid tomato sauce.

The tomato sauce was cooled at 4° C. and then fed into a deep-freezing system of the above-described type.

In particular, drops of tomato sauce having a diameter of about 10 mm were obtained through a perforated plate provided with round passages having a diameter of 8 mm, which were caused to fall by gravity in a first deep-freezing section and in particular in a liquid nitrogen bath (at the temperature of −197° C.).

The tomato sauce drops in the liquid nitrogen bath underwent a rapid deep-freezing of the external surface with subsequent hardening thereof and formation of partially deep-frozen granules having a deep-frozen external crust and a not completely deep-frozen core.

Then, the tomato sauce partially deep-frozen granules were collected on a conveyor belt partially immersed in the nitrogen head.

Then, after a residence of about 20 seconds in the liquid nitrogen bath, by means of the conveyor belt, the tomato sauce partially deep-frozen granules were caused to emerge from the liquid nitrogen bath and they were fed into a second deep-freezing section at −65° C. wherein, in about 100 seconds, the deep-freezing was completed, thus obtaining tomato sauce completely deep-frozen granules. Then, the tomato sauce deep-frozen granules were fed into a refining device of the granulator type.

In the granulator the tomato sauce deep-frozen granules were transported through an Archimedean screw and pushed towards a grid having 10 mm-wide square-shaped passages, thus obtaining at the output of the granulator tomato sauce deep-frozen granules essentially homogeneous in size, having a diameter of about 10 mm and a weight of about 2.5 g. The density of the granules was of about 1.0 g/cm$^3$.

Tomato sauce deep-frozen granules essentially homogeneous in size were then packaged and stored according to known procedures at a temperature of −25° C.

The condiment in granules of the present invention has the advantage that it is easily dosed, and the user is not constrained, when using it, by the size of large blocks (in comparison with the portion size) as in the prior art.

In other words, the user can use the exact quantity of condiment, required by the specific case, by drawing it from the package in a simple and fast way, and put the unused part back into the freezer.

Moreover, thanks to the granular shape and particularly to the reduced size of the granules, the thawing of the condiment according to the invention is rapid and homogeneous, independently of the need to heat or not the condiment.

In case of heating, in fact, this is homogeneous and rapid, and the organoleptic features of the product being heated and served are thus similarly homogeneous.

Without heating, for example also in cases in which it is not even recommended, the thawing time of the present condiment at room temperature is in any case short by virtue of the granule size and, therefore, the user rapidly has at their disposal a condiment, in this case cold, with optimal organoleptic properties.

Advantageously, the thawing time of the condiment according to the invention is comprised between 60 and 180 seconds, preferably between 60 and 120 seconds.

Advantageously the condiment according to the invention can optionally be heated or cooked in a microwave oven, pan, wok, vapor oven, bain-marie, without suffering from the drawbacks due to a temperature unevenness.

Moreover, the small granule size and their consequent short thawing time minimize any problems caused by phase separation of the condiment upon thawing, due to the presence of lipids in the composition of the condiment.

Moreover, the condiment according to the present invention, thanks to the portioning versatility, allows a reduction of wastes, since it is possible to use only and exactly the required quantity.

Thanks to the above-described features, the condiment according to the present invention lends itself to being used in various combinations and associations, allowing recipes to be considerably varied and personalized. This advantage is even more appreciated when it is considered that the pre-emptive defrosting of the product is not required, by virtue of the reduced size of the granules, and that granules can be directly drawn from the freezer in the desired quantities without creating waste.

The above-mentioned advantages are considerable both at the domestic level and at the catering level.

Moreover, the weight being equal and with respect to known condiments, the condiments according to the present invention has the advantage of lower overall bulkiness, due to the shape and size of the granules, with consequent lower transport and storage costs.

Moreover, concerning the deep-freezing system according to the invention, it must be added that advantageously there is no need for pauses for the cleaning and sterilization of the surfaces, which are required neither during the deep-freezing of a given condiment, nor when passing from one recipe to another.

The above is made possible by the nitrogen bath which has the advantageous effect of deep-freezing the external layer of the condiment drops before they can stick to any surface of the deep-freezing sections, for example to the conveyor means, and therefore undesirable phenomena such as the formation of patinas, fouling and the like do not occur, since there is no contact with the condiment in its liquid state.

Moreover, given the very low temperatures, the conditions within the system are virtually aseptic.

Finally the above-mentioned advantages in terms of energy saving must be considered, which are made possible by the use of liquid nitrogen vapors released in the first deep-freezing section to cool the second deep-freezing section.

In order to meet specific and contingent requirements, a person skilled in the art can bring several modifications to the deep-freezing system and method in the embodiments shown and described, all nevertheless falling within the scope of protection of the invention as defined by the following claims.

The invention claimed is:

1. A deep-frozen condiment in the form of granules having a porous surface and having an average weight of 6.0 g or less, and essentially homogeneous in size having a diameter comprised between 1 mm and 20 mm, said granules being apt to determine a rapid and uniform thawing of said deep-frozen condiment, even in the absence of a prior defrosting, wherein said condiment is selected from the group consisting of sauces, pastes, pâtés, creams and pizza toppings, of the type suitable for use and consumption with rice, pasta, toasted bread, canapés, hot, after cooking, having hygienic and organoleptic features comparable to those of a corresponding fresh condiment prior to the deep freezing.

2. Condiment according to claim 1, consisting of tomato-based, white sauce based, fat-based, oil-based, cheese-based, mayonnaise-based, meat-based, fish-based, vegetable-based or mixed base sauces.

3. Condiment according to claim 1, wherein said condiment contains at least 3% lipids by weight as a percent of total weight.

* * * * *